(12) United States Patent
Riessbeck et al.

(10) Patent No.: US 10,244,890 B2
(45) Date of Patent: Apr. 2, 2019

(54) BEVERAGE PREPARATION DEVICE AND OPERATING METHOD

(71) Applicant: Eugster/Frismag AG, Amriswil (CH)

(72) Inventors: Wolfgang Riessbeck, Landschlacht (CH); Simon Wagner, Amriswil (CH)

(73) Assignee: Eugster/Frismag AG, Amriswil (CH)

( * ) Notice: Subject to any disclaimer, the term of this patent is extended or adjusted under 35 U.S.C. 154(b) by 0 days.

(21) Appl. No.: 15/021,955

(22) PCT Filed: Jun. 10, 2015

(86) PCT No.: PCT/EP2015/062921
§ 371 (c)(1),
(2) Date: Mar. 15, 2016

(87) PCT Pub. No.: WO2015/193148
PCT Pub. Date: Dec. 23, 2015

(65) Prior Publication Data
US 2017/0095111 A1  Apr. 6, 2017

(30) Foreign Application Priority Data
Jun. 16, 2014 (DE) .................. 10 2014 108 415

(51) Int. Cl.
*A47J 31/54* (2006.01)
*A47J 31/44* (2006.01)
(Continued)

(52) U.S. Cl.
CPC ......... *A47J 31/542* (2013.01); *A47J 31/4489* (2013.01); *A47J 31/46* (2013.01); *A47J 31/60* (2013.01)

(58) Field of Classification Search
CPC ...... A47J 31/542; A47J 31/4489; A47J 31/46; A47J 31/60
See application file for complete search history.

(56) References Cited

U.S. PATENT DOCUMENTS 4,949,627 A * 8/1990 Nordskog ............. A47J 31/005
99/281
6,202,894 B1 * 3/2001 Struminski .......... B67D 1/0037
222/129.3
(Continued)

FOREIGN PATENT DOCUMENTS

DE       195 03 618      8/1996
DE       102010007143    8/2011
(Continued)

OTHER PUBLICATIONS

Mechanical English Translation of German Office Action for Patent Application No. 10 2014 108 415.2 dated May 18, 2015.*
(Continued)

*Primary Examiner* — Anthony J Weier
(74) *Attorney, Agent, or Firm* — Bachman & LaPointe, PC

(57) ABSTRACT

A beverage preparation device, in particular a coffee maker, including at least one water pump for supplying water to a first continuous-flow heater (17), which is embodied for generating hot water, and to a second continuous-flow heater (18), which is also embodied for generating hot water and/or for generating steam, and having a control unit for controlling the at least one pump as well as the continuous-flow heaters (17, 18) for realizing different operating modes. According to the invention, provision is made for the first continuous-flow heater (17) to be connected to a first inlet (3) of a manifold valve (21) via a first connecting line (20) and for the second continuous-flow heater (18) to be connected to a second inlet (1) of the same manifold valve (21) via a second connecting line (22), and for the manifold valve (21) to be embodied in such a manner that the first inlet (3) and the second inlet (1) are fluidically connected to separate outlets in a first switch position and that the first inlet (3) as
(Continued)

well as the second inlet (1) are fluidically connected to a common outlet in a second switch position.

19 Claims, 2 Drawing Sheets

(51) Int. Cl.
*A47J 31/60* (2006.01)
*A47J 31/46* (2006.01)

(56) References Cited

U.S. PATENT DOCUMENTS

| | | | |
|---|---|---|---|
| 7,178,452 B2 | 2/2007 | Fischer | |
| 8,151,832 B1* | 4/2012 | Dorney | A47G 19/2227 |
| | | | 141/360 |
| 8,364,030 B2 | 1/2013 | Reyhanloo | |
| 9,038,529 B2 | 5/2015 | Riessbeck et al. | |
| 9,622,615 B2* | 4/2017 | Hecht | A47J 31/52 |
| 2004/0193326 A1* | 9/2004 | Phillips | B67D 1/1204 |
| | | | 700/282 |
| 2010/0003022 A1* | 1/2010 | Reyhanloo | A47J 31/54 |
| | | | 392/465 |
| 2010/0064900 A1* | 3/2010 | Reyhanloo | A47J 31/4485 |
| | | | 99/300 |
| 2010/0126354 A1* | 5/2010 | Mahlich | A47J 31/3671 |
| | | | 99/293 |
| 2012/0138632 A1* | 6/2012 | Li | A47J 31/41 |
| | | | 222/64 |
| 2015/0158608 A1* | 6/2015 | Talarico | B65B 29/02 |
| | | | 53/440 |

FOREIGN PATENT DOCUMENTS

| | | |
|---|---|---|
| EP | 1 300 105 | 4/2003 |
| EP | 2019614 | 2/2009 |
| EP | 2612577 | 7/2013 |
| WO | 2007134476 | 11/2007 |

OTHER PUBLICATIONS

German Office action for Patent Application No. 10 2014 108 415.2 dated May 18, 2015.
International search report for Application No. PCT/EP2015/082921 dated Aug. 24, 2015.

\* cited by examiner

BEVERAGE PREPARATION DEVICE AND OPERATING METHOD

BACKGROUND OF THE INVENTION

The invention relates to a beverage preparation device, in particular a coffee maker, more preferably a fully-automatic coffee maker, comprising at least one water pump for supplying water to a first continuous-flow heater, which is embodied for generating hot water, and to a second continuous-flow heater, which is also embodied for generating hot water and/or for generating steam, and comprising a control unit for controlling the at least one pump as well as the continuous-flow heaters, in particular following a user default and/or in the context of an automatic sequence control for realizing different operating modes. The invention further relates to a method for operating a beverage preparation device.

A beverage preparation device is known from EP 2 019 614 B1, which comprises two continuous-flow heaters, which can in each case be switched between hot water generation and steam generation, wherein the continuous-flow heaters can be connected to one another, so as to thus be able to alternatively generate a large quantity of hot water or a large quantity of steam. For the purpose of connecting to one another, separate magnetic valves are assigned to the continuous flow heaters. The disadvantage of the known devices if the complex design thereof and the plurality of cables, which are required for controlling the magnetic valve actuators. In addition, the functional range is limited with regard to the combination or interconnection, respectively, of the continuous-flow heaters.

DE 195 03 618 C1 describes a water release valve for hot beverage makers, in the case of which two inlets are connected to a common outlet.

EP 2 612 577 A1 describes a beverage preparation device, in the case of which two continuous-flow heaters are connected to separate inlets of a manifold valve.

SUMMARY OF THE INVENTION

Based on the afore-mentioned prior art, the invention is based on the object of specifying a beverage preparation device, which is simplified with regard to its design and which is thus more cost-efficient, comprising two continuous-flow heaters, the functionality of which is increased preferably as compared to the prior art, in particular also in the case of an optional use of continuous-flow heaters, which cannot be switched between a steam generation function and a hot water generation function, thus continuous-flow heaters, which each only have one functionality.

The object is further to specify an improved operating method, which provides for an increased functionality.

With regard to the beverage preparation device, this object is solved by means of the features of claim 1, and with regard to the operating method, it is solved by means of the features of claim 15. Advantageous further developments of the invention are specified in the subclaims. All combinations of at least two features, which are disclosed in the description, the claims and/or the figures, fall within the context of the invention.

To avoid repetitions, features, which are disclosed according to the device, shall also be considered as being disclosed according to the method and shall be capable of being claimed. Features, which are disclosed according to the method shall likewise be considered as being disclosed according to the device and shall be capable of being claimed.

According to the invention, provision is made for the first continuous-flow heater to be connected to a first inlet of a manifold valve via a first connecting line and for the second continuous-flow heater to be connected to a second manifold valve, that is, a different inlet thereof, via a second connecting line, and for the manifold valve to be embodied in such a manner that the first inlet is fluidically connected to a first outlet and the second inlet is connected to a (different) second outlet in a first switch position and that the first inlet as well as the second inlet are fluidically connected to a common outlet in a second switch position. In other words, the two inlets are connected to separate outlets in the first switch position and are connected to a common outlet in the second switch position, so that, in the latter case, the fluid flows, which are supplied via the two inlets, add up. It is possible by means of the beverage preparation device according to the invention to interconnect the two continuous-flow heaters by means of a single manifold valve, in particular a disk valve, so that the provision of separate valves, as in the prior art, and thus also the required cabling, can be forgone.

Preferably, the manifold valve comprises more than only two inlets and/or more than two outlets, so that a plurality of switching options are at hand, so as to be able to fluidically connect the continuous-flow heaters to different consumers, in particular exclusively to two consumers at the same time or to more than two consumers at the same time or, in the alternative, to a common consumer, without it being necessary to provide for further separate valves, as in the prior art. In addition to the switching options with regard to the continuous-flow heaters, the manifold valve, which is used according to the invention, preferably has at least one further function, preferably a plurality of further functions, for example for taking in air for generating milk froth and/or for flushing and/or steam cleaning different lines, for example also of an air line or a mixing line.

With regard to its basic design, a manifold valve in the case of a beverage preparation device, which is embodied according to the concept of the invention, can be realized as manifold valve, as it is described in European patent EP 1 300 105 B1 by applicant, wherein it goes without saying that provision needs to be made for two separate inlets for the two continuous-flow heaters, and wherein the fluid flows of the continuous-flow heaters can be interconnected or combined, respectively, and be guided separately from one another, in particular to different consumers, in a different switch position by means of the manifold valve. Preferably, the manifold valve, which is used, also realizes a cleaning function for cleaning a preferably provided frothing device and/or of a milk intake line, as it is described in German patent DE 10 2010 007 143 B4 by applicant, wherein either both continuous-flow heaters are interconnected by means of the manifold valve for the corresponding function or are operated only individually or simultaneously and the fluid flows are guided to separate lines and/or consumers.

The beverage preparation device according to the invention furthermore makes it unnecessary that one or both continuous-flow heaters must be capable of being switched between hot water generation and steam generation, so as to be able to generate a larger volume flow of hot water, which is obviously also conceivable and which is provided in the context of further developments of the invention. According to a preferred embodiment of the invention according to a further development, as will be explained in detail later, the beverage preparation device provides the opportunity to also provide a larger hot water quantity than would be possible with only a single continuous-flow heater, when one of the continuous-flow heaters is embodied exclusively for hot water preparation and the other continuous-flow heater is embodied exclusively for steam generation. For this purpose, the steam generated by the one continuous-flow heater must be supplied to the hot water generated by the other continuous-flow heater by means of the manifold valve. Due to the fact that the hot water continuous-flow heater can in this case be loaded with a larger water volume flow than would typically be possible to reach a certain hot water temperature, and due to the fact that the temperature difference for reaching the desired hot water temperature is attained by means of the steam supply, it is possible to realize a hot water volume flow, which is larger than would be possible with only one continuous-flow heater (as a result of the limited heat output), in a surprisingly simple manner. In other words, it is possible to operate the first continuous-flow heater, which is embodied, that is, configured or controlled, respectively, exclusively for the hot water operation, with a water flow rate, which is higher than the normally common water flow rate. A lower water temperature than is common or desired, respectively, is reached by means of the increased flow rate as a result of the limited maximum output of the continuous-flow heater. To increase the water temperature to the desired temperature, steam from the second continuous-flow heater, which is preferably embodied, that is, configured or controlled, respectively, exclusively for generating steam, is then added, in particular in the manifold valve. It is particularly preferred, when the two continuous-flow heaters differ from one another with regard to their heat output, in particular by at least 100 W.

In the alternative, it can also be realized that at least one of the continuous-flow heaters, or exclusively one of the continuous-flow heaters or both continuous-flow heaters are embodied, that is, configured or controlled, respectively, for realizing one functionality, that is, water generation or steam generation. The feature that a continuous-flow heater is embodied for generating hot water or steam, respectively, means that the flow rate of the at least one pump (in particular as a result of a corresponding planned performance of the pump by means of the control means and/or the connection or turn-off of a further pump by means of the control means) is adjusted to the heat output of the continuous-flow heater such that the corresponding product, namely hot water or steam, respectively, results.

Different operating modes of the beverage preparation device can be provided by the user, preferably either via a menu navigation or via single-code buttons (so-called one-touch operation) in a particularly preferred manner. More preferably, at least two of the following operating modes can be selected by the user and can be carried out by the beverage preparation device: coffee production; production of hot milk (without froth); production of milk froth; obtaining hot water; in particular by means of a pump and by means of a continuous-flow heater; obtaining large quantities of hot water, in particular by means of two pumps and/or two continuous-flow heaters, both of which either produce hot water or, in the alternative, one continuous-flow heater produces hot water and one continuous-flow heater produces steam, wherein steam and hot water are then mixed; simultaneous coffee production and production of hot milk; simultaneous coffee production and production of milk froth; simultaneous coffee production and production of hot water.

In a further development of the invention, provision is made according to a first alternative for the common outlet, on which the first and the second inlet are brought together, is one of the preferably two separate outlets, which are supplied by the first and second inlet in the second switch position of the manifold valve. According to an alternative embodiment, provision is made for the common outlet to be formed by an outlet, which is provided additionally to the preferably two separate outlets and which is more preferably characterized by a larger flow cross section than the respective separate outlets, which, however, is not absolutely necessary, in particular if a fluid speed increase is acceptable.

As already mentioned above, it is particularly advantageous when the manifold valve, which is used in the context of the invention, is embodied as disk valve, comprising two disks, which can be rotated relative to one another, wherein the relative rotational position provides the respective switch position. For rotating one of the disks of the valve, provision is preferably made for an electric motor, in particular a step motor. An embodiment of the manifold valve as ceramic valve, that is, comprising valve disks, which are embodied from a ceramic, is particularly preferred.

In a further development of the invention, as already explained above as well, the manifold valve does not only have the first and the second inlet for supplying the manifold valve with the fluids, which originate from the continuous-flow heaters, but comprises at least one further inlet, in particular an air inlet, for taking in air into a switch position or in an operating mode, respectively, for generating milk froth for specialty beverages, such as cappuccino or latte macchiato. Provision is made in the alternative or additionally for at least one further outlet to be provided in addition to the separate outlets and/or the common outlet, in particular for transferring air to an optional milk frothing device of the beverage preparation device, wherein it is more preferably, when the first and/or the second inlet is connected to the further outlet, in particular an air outlet, in a switch position or in an operating mode, respectively, for flushing purposes or for steam cleaning purposes, so as to thus flush or steam-clean this outlet and a line connected thereto, in particular an air line and/or a milk intake line, which is connected to the air line. As a result of the provision of such a multi-functional manifold valve, the continuous-flow heaters can take over a variety of functionalities without the necessity of providing separate additional valves.

An embodiment, in the case of which the first and/or the second connecting line for fluidically connecting a continuous-flow heater to the manifold valve is/are free from junctions, is particularly advantageous. In contrast to the prior art, such junctions are not necessary in the case of a beverage preparation device according to the invention, because all of the valve functions are preferably taken over by a common manifold. According to an alternative embodiment, provision is made for at least one, preferably exclusively one of the connecting lines to have a single junction, in particular to a brewing unit for leaching out coffee powder, preferably via a pressure control valve.

There are different options with regard to the design of the continuous-flow heaters. As mentioned, it is possible, for instance, for at least one of the continuous-flow heater, preferably both continuous-flow heaters, to be embodied, that is, configured or controlled, respectively, for only a single functionality, that is, to be embodied for exclusively generating either hot water or stream. In the alternative, it is possible for at least one of the continuous-flow heaters or both continuous-flow heaters to be capable of being switched between a steam generating mode and a hot water generating mode, which is possible by means of a corresponding current feed and/or the adaptation of the pump, which is assigned to the continuous-flow heater.

On principle, it is possible to supply both continuous-flow heaters with water by means of a single pump. An embodiment, in the case of which each continuous-flow heater is assigned its own pump to supply water for generating hot water or steam to the respective continuous-flow heater, is preferred.

In a further development of the invention, provision is preferably made for both continuous-flow heaters to be supplied with water simultaneously for the respective generation of hot water in at least a so-called large quantity hot water operating mode, in particular via one pump in each case. A large quantity of hot water hereby means that, compared to supplying only one continuous-flow heater with water, a larger quantity of water can be provided by simultaneously operating a further continuous-flow heater, preferably comprising its own assigned pump. In the alternative, it is possible in the case of an embodiment comprising only one pump to operate the latter with a flow rate, which is larger in the large quantity operating mode than in a (normal) hot water operating mode. Regardless of how the larger volume flow is generated (two pumps or one pump comprising a higher flow rate), it is possible according to a first alternative to bring the hot water volume flows and the manifold valve together or, according to a second alternative, to distribute them to separate outlets, in particular simultaneously to only two outlets or, in the alternative, to at least three outlets.

By bringing the fluid flows from the first and second inlet together, it is thus possible in the case of the afore-mentioned, first alternative, to supply a common consumer, for example a water delivery faucet (tapping or delivery point, respectively) with the larger hot water volume flow, in particular for preparing Americano coffee and/or, in the alternative large quantity hot water operating mode, in which the hot water volume flows are distributed to separate outlets by means of the manifold valve, to simultaneously supply at least two different consumers, for example simultaneously two brewing units or simultaneously one brewing unit and a water delivery faucet.

A hot water operating mode, in the case of which the first and the second inlet of the manifold valve are either connected to the common outlet of the manifold valve or to separate outlets and in which hot water can be generated by means of the first continuous-flow heater, can be realized in a particularly preferable manner by means of the beverage preparation device, wherein the first continuous-flow heater is preferably, but not necessarily embodied exclusively for generating hot water, that is, not for generating steam. At the same time, steam can be generated by means of the second continuous-flow heater, wherein the second continuous-flow heater is preferably embodied exclusively for generating steam or, in the alternative, can be switched hot water generation and steam generation. In the hot water operating mode, the steam, which is generated by the second continuous-flow heater, is supplied to the hot water flow, which is generated by the first continuous-flow heater, by means of the manifold valve, preferably in the manifold valve itself, so as to thus reach the desired final temperature. In a particularly preferred manner, the first continuous-flow heater is supplied with a larger quantity of water volume flow during this hot water operating mode than in a normal hot water mode. This is preferably realized in that a pump, which is assigned to the first continuous-flow heater, is operated at a higher flow rate than in the normal hot water mode, in which steam from the second continuous-flow heater is not supplied additionally to the hot water, which is heated by the first continuous-flow heater. The afore-mentioned hot water operating mode makes it possible to generate a comparatively large volume flow of hot water, even if only one of the continuous-flow heaters directly generates hot water and the other continuous-flow heater generates steam. The realization of this hot water operating mode also makes it possible to use continuous-flow heaters, which are configured or embodied in a simple manner, respectively, thus a first continuous-flow heater, which is embodied or can be controlled, respectively, exclusively for generating hot water, and a second continuous-flow heater, which is embodied, that is, which can be controlled, exclusively for generating steam.

A combined steam and hot water operating mode, in which the first and the second inlet of the manifold valve are connected to separate outlets and in which hot water can be generated by means of the first continuous-flow heater and steam can be generated by means of the second continuous-flow heater, so as to simultaneously supply hot water to a first consumer, in particular a brewing unit or steam to a water delivery faucet and a further (other) second consumer, in particular a frothing device for milk, can be realized in a particularly preferred manner by means of the beverage preparation device.

The invention also leads to a method for operating a beverage preparation device, preferably a beverage preparation device, which is embodied as described above. It is the core of the method for a first and a second continuous-flow heater to be supplied with water by means of a common water pump or by means of separate water pumps, so as to heat said water by means of the continuous-flow heaters to generate hot water or steam. According to the invention, provision is made for the continuous-flow heaters to be connected to separate inlets of a manifold valve and for the (initially separate) fluid flows, which are conveyed to the first inlet and to the second inlet, to be joined in a first switch position by means of the manifold valve, that is, to be supplied to a common outlet of the manifold valve and to then be more preferably guided to a common consumer, and for the fluid flows, which are conveyed to the first and second inlet, to be transferred separately from one another, in particular via separate outlets of the manifold valve, preferably simultaneously via exclusively two or more than two outlets, more preferably to different consumers, in a second switch position by means of the manifold valve, in particular in a different rotational position of a manifold valve, which is embodied as disk valve.

It is particularly preferred, if, in a hot water operating mode, the first and the second inlet of the manifold valve are either connected to separate outlets or to a common outlet of the manifold valve, if hot water is generated by means of the first continuous-flow heater, which is preferably, but not necessarily embodied exclusively for generating hot water, and if steam is simultaneously generated by means of the second continuous-flow heater, which is preferably embodied exclusively for generating steam, and that the hot water, which the first continuous-flow heater heats to a first temperature, is heated to a second temperature, which is higher than the first temperature, by means of adding steam, in particular in the manifold valve. Provision is thus made for the steam, which is generated by the second steam generator, to be added to the hot water, which originated from the first continuous-flow heater, preferably in the manifold vale, so as to further increase the temperature of the hot water to the desired temperature. In an advantageous further development, this makes it possible to operate a pump, which is assigned to the first continuous-flow heater, for supplying hot water to the first continuous-flow heater at a flow rate, which is increased as compared to a normal hot water operating mode, in which no steam is added, whereby, after passing through the first continuous-flow heater, the water does not yet have the desired target temperature, which is then reached, however, by skillfully adding the steam from the second continuous-flow heater.

With regard to alternative embodiments and further developments of the method according to the invention, reference is made to the description of the beverage preparation device. The method features resulting therefrom shall apply as being disclosed even without the respective device features specified therein, and shall be capable of being claimed in the context of further developments.

BRIEF DESCRIPTION OF THE DRAWINGS

Further advantages, features and details of the invention follow from the description below of preferred exemplary embodiments as well as by means of the drawings.

DETAILED DESCRIPTION

Figure 1:
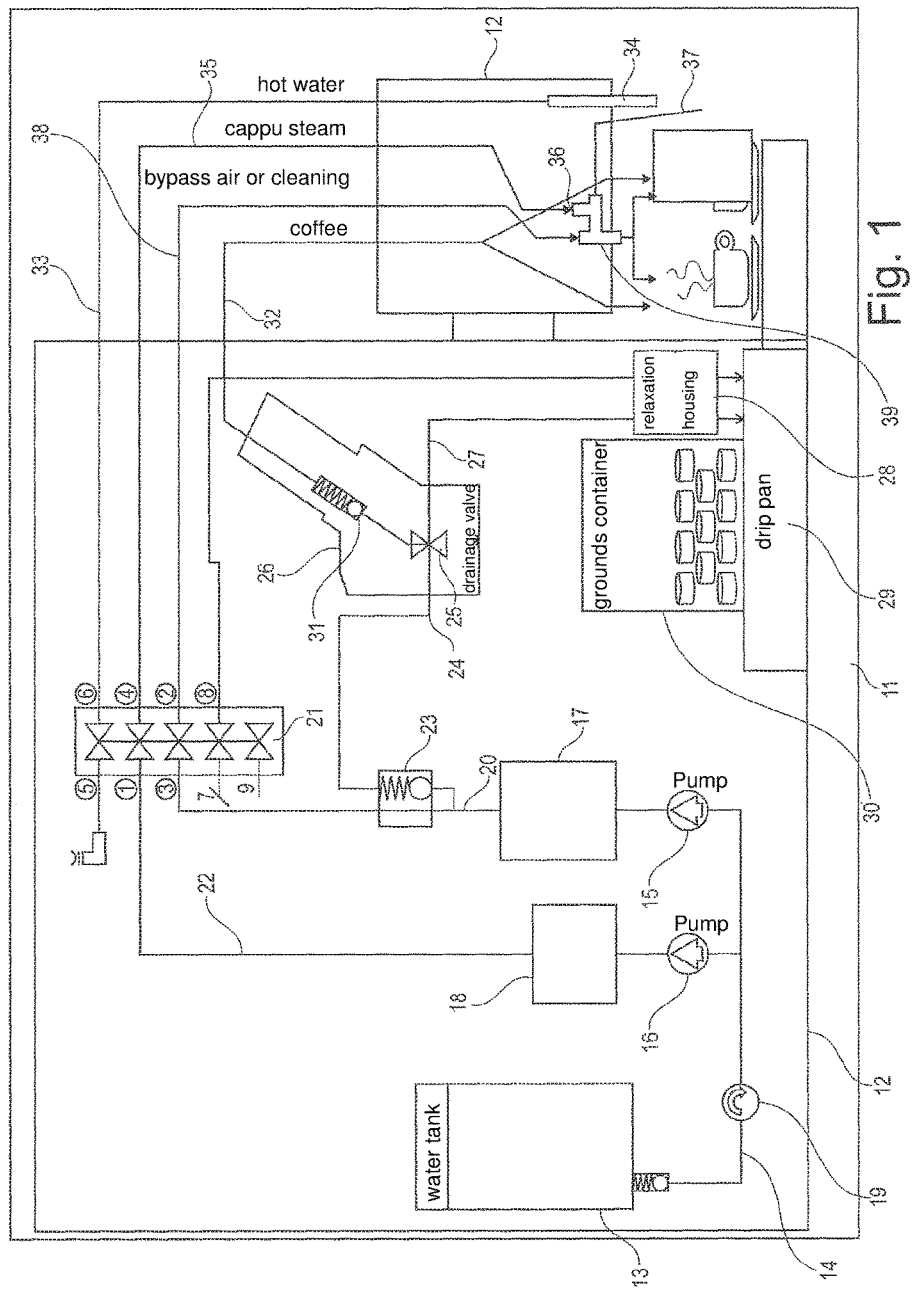
FIG. 1 shows a preferred embodiment alternative of a beverage preparation device and FIGS. 2, 3, 4, 5, 6, 7, 8, and 9 show different switch positions of a manifold valve, which is preferably used in the case of a beverage preparation device according to FIG. 1, wherein it is not required for all of the switch positions to be capable of being realized, which, however, is preferable. A beverage preparation device comprising a manifold valve, which realizes an arbitrary combination or an arbitrary selection of the shown switch positions, respectively, is to also be disclosed and capable of being claimed.

The same elements and elements having the same function are identified with the same reference numerals in the figures.

FIG. 1 shows a beverage preparation device, here a fully-automatic coffee maker 1. The latter comprises a housing 12, on the outside of which a dispensing arrangement 40 comprising various dispensing options for coffee, milk, milk froth and hot water, which will be explained below, is arranged.

The beverage preparation device 11 comprises a water tank 13 (additionally or in the alternative a non-illustrated fixed water connection) as water supply source. At least one water line 14 leads from said water supply source to a first pump 15 and to a second pump 16 for conveying the water to a first continuous-flow heater 17 (by means of the first pump 15) and to a second continuous-flow heater 18 (by means of the second pump 16). The conveyed water quantity is thereby measured by means of a flow meter 19, which is provided in the water line 14 herein in an exemplary manner, for a control unit (not shown).

As follows from FIG. 1, the first continuous-flow heater 17 is fluidically connected to a first inlet 3 of a manifold valve 21, which is embodied as disk valve comprising ceramic disks and which is only illustrated schematically, via a first connecting line 20. The second continuous-flow heater 18 is connected to a second inlet 1 of the manifold valve 21 via a second connecting line 22, which is separate or independent, respectively, from the first connecting line 20. A third inlet 5 serves as air intake. The inlets identified with reference numerals 7 and 9 are ventilation inlets. The manifold valve 21 comprises a plurality of outlets, for example four herein, which are identified with reference numerals 2, 4, 6, 8, which can be fluidically connected to one or a plurality of inlets in a variety of ways, as will be explained in an exemplary manner below by means of FIGS. 2 to 9. The inlets 1, 3, 5, 7, 9 of the manifold valve according to FIG. 1 thereby correspond to the inlets of the circuit diagrams of FIGS. 2 to 9, which are identified in the same manner. The same applies analogously for the outlets.

As follows from FIG. 1, the second connecting line 22 is free from junctions. The first connecting line 20 has a single junction to a pressure control valve 23, which is connected to a drainage valve 25 of a brewing unit 26 via a line 24. The drainage valve 25, in turn, is connected via a line 27 to a relaxation housing 28, from which liquid can escape into a drip pan 29. In the shown exemplary embodiment, the drip pan 29 is located below a grounds container 30 for coffee powder, which is leached by means of the brewing unit 26.

As follows from the fluid circuit diagram according to FIG. 1, the first continuous-flow heater 17 supplies hot water for a coffee brewing process to a brewing chamber 31 of the brewing unit 26 via the line 24. The finished coffee is then dispensed via a dispensing line 32 in the direction of the dispensing device 12.

It can furthermore be seen from FIG. 1 that the outlet 6 is connected to a hot water delivery faucet 34 via a hot water line 33. The outlet identified with reference numeral 4 is connected via a combined air and cleaning line 35 to an air supply 36 for supplying air into a milk intake line 37, which can be cleaned or steam-cleaned, respectively, by supplying the air and cleaning line 35 with water and/or steam. The outlet identified with reference numeral 2 is connected via a steam line 38 to a milk frothing device 39, more precisely to a Venturi valve of the milk frothing device 39, for generating milk froth and/or for heating milk.

Hot milk is thereby generated only if no air is supplied via the air and cleaning line 35 to the milk frothing device 39 in an operating mode during the steam supply. If, in contrast, air is simultaneously supplied in a different operating mode as a result of a corresponding switch position of the manifold valve 21, milk froth is produced in a manner, which is known per se.

The two continuous-flow heaters 17, 18 can be embodied or controlled/configured, respectively, in a variety of ways. At least in the shown exemplary embodiment, the first continuous-flow heater 17 has a heat output, here for example 1400 Watts, which is larger than the heat output of the second continuous-flow heater 18, here for example 1200 or 1080 Watts.

On principle, the first continuous-flow heater can be embodied exclusively for generating hot water or exclusively for generating steam or, in different operating modes, to generate hot water and to generate hot steam. The same also applies for the second continuous-flow heater 18. A configuration, in the case of which the first continuous-flow heater 17 can generate exclusively hot water and the second continuous-flow heater 18 can generate exclusively steam, is particularly preferred.

Possible switch states of the manifold valve 21 are shown in FIG. 2 to FIG. 9, wherein it is not required for all of the switch states to be realized and further switch states are possible as well or can be realized additionally, respectively.

Figure 2:
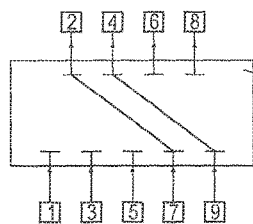

FIG. 2 shows a so-called initial position of the manifold valve 21. As can be seen from FIG. 2, the second outlet is connected to the ventilation inlet 7 and the outlet 4, which leads to the air supply 36, is connected to the ventilation inlet 9, in this initial position.

Figure 3:
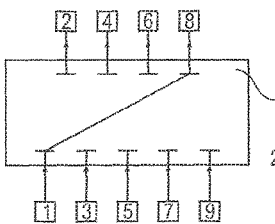

FIG. 3 shows an operating mode relaxation. The corresponding switch position of the manifold valve 21 connects the second inlet 1, which is fluidically connected to the second continuous-flow heater 18, to the drip pan 29 via the optional relaxation housing 28.

Figure 4:
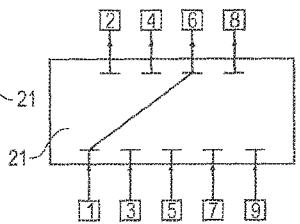

FIG. 4 shows an operating mode hot water with corresponding switch position. The second inlet 1 is connected herein to the outlet 6, which leads to the hot water delivery faucet 34, via the hot water line 33. The second pump 16 conveys water through the second continuous-flow heater 18, which is in operation and which produces hot water, which can then be extracted directly at the hot water delivery faucet 34.

Figure 5:
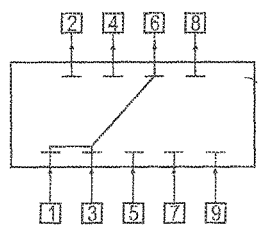

FIG. 5 shows a large quantity hot water operating mode. The first and the second inlet 3, 1 and thus both continuous-flow heaters 17, 18, are fluidically connected herein to the (common) outlet 6. Both pumps 15, 16 convey water through the respective corresponding continuous-flow heater 17, 18, wherein both continuous-flow heaters 17, 18 produce hot water and the hot water volume flows are brought together by means of the manifold valve 21 and are guided to the hot water delivery faucet 34 (tapping point or hot water outlet, respectively) via the common outlet 6 and the hot water line 33. The operating mode shown in FIG. 5 or the corresponding switch position, respectively, can also be realized differently. For this purpose, hot water is generated by means of one of the two continuous-flow heaters and steam is generated by means of the other continuous-flow heater, and the steam volume flow is guided to the hot water volume flow by means of the manifold valve 21, whereby the water temperature of the hot water of the continuous-flow heater, which produces the hot water, is increased again. In this case, the corresponding pump is preferably operated at a higher flow rate than in the case of a normal water operating mode.

In the case of this configuration, it is particularly preferred, if the two continuous-flow heaters can in each case fulfill only one function, namely the one continuous-flow heater can only produce hot water and the other continuous-flow heater can only generate steam.

Figure 6:
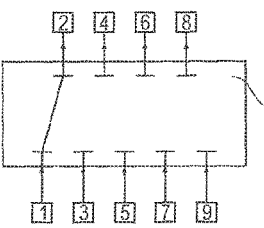

The operating mode heat milk is shown in FIG. 6. The second inlet 1 is connected to the outlet 2. At the same time, there is no connection between the inlet 5 and the outlet 4. Steam, which is guided to the milk frothing device 39 or to the Venturi nozzle thereof, respectively, is generated by means of the second continuous-flow heater 18, whereby milk is absorbed from a storage container via the milk intake line 37 and is heated.

Figure 7:
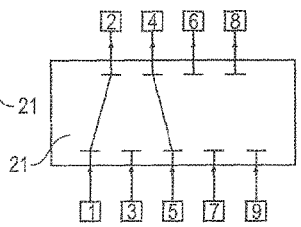

FIG. 7 shows a switch position generate milk froth. In contrast to the illustration according to FIG. 6, a fluidic connection is established between the inlet 5 and the outlet 4, so that air is simultaneously supplied to the milk via the air supply 36 during the milk intake.

Figure 8:
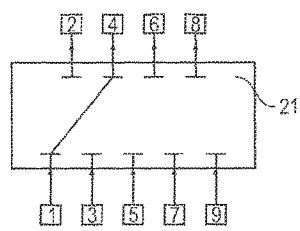

FIG. 8 shows an operating mode steam clean air line. It can be seen that the inlet 1 of the manifold valve is connected to the outlet 4. Steam is now produced by means of the second continuous-flow heater 18 and is supplied to the combined air and cleaning line 35, so as to steam clean the latter.

Figure 9:
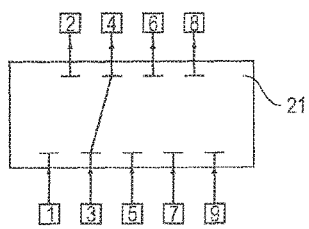

FIG. 9 shows the operating mode flush air line. The air and cleaning line 35 is connected herein to the first inlet 3 via the outlet 4. The first continuous-flow heater 17 produces hot water.

The invention claimed is:

1. A beverage preparation device, comprising at least one water pump for supplying water to a first continuous-flow heater (17), which is embodied for generating hot water, and to a second continuous-flow heater (18), which is also embodied for generating hot water and/or for generating steam, and comprising a control unit for controlling the at least one pump (15, 16) as well as the continuous-flow heaters (17, 18) for realizing different operating modes,
wherein the first continuous-flow heater (17) is connected to a first inlet (3) of a manifold valve (21) via a first connecting line (20) and the second continuous-flow heater (18) is connected to a second inlet (1) of the same manifold valve (21) via a second connecting line (22), and wherein the manifold valve (21) is embodied in such a manner that the first inlet (3) and the second inlet (1) are fluidically connected to separate outlets in a first switch position and that the first inlet (3) as well as the second inlet (1) are fluidically connected to a common outlet in a second switch position, and wherein the manifold valve (21) is a disk valve, comprising disks, which can be rotated relative to one another via an electric motor for setting different switch positions.

2. The beverage preparation device according to claim 1, wherein the common outlet (6) in the second switch position is one of the separate outlets in the first switch position.

3. The beverage preparation device according to claim 1, wherein in addition to the first inlet (3) and the second inlet (1), the manifold valve (21) has at least one further inlet (5) for taking in air for generating milk froth, and/or at least one further outlet in addition to the separate outlets and the common outlet for air for producing milk froth, wherein the first and/or the second inlet (3, 1) is connected to the further outlet in a switch position for flushing purposes and/or steam cleaning purposes.

4. The beverage preparation device according to claim 1, wherein the first connecting line (20) is free from junctions, or wherein the first connecting line (20) has exclusively one junction to a pressure control valve (23) and/or to a brewing unit for leaching coffee powder.

5. The beverage preparation device according to claim 1, wherein the second connecting line (22) is free from junctions, or wherein the second connecting line (22) has exclusively one junction to a pressure control valve (23) and/or to a brewing unit for leaching coffee powder.

6. The beverage preparation device according to claim 1, wherein the first continuous-flow heater (17) is embodied exclusively for generating hot water, or wherein the first continuous-flow heater (17) can be switched between a hot water generating mode and a steam generating mode.

7. The beverage preparation device according to claim 1, wherein the second continuous-flow heater (18) is embodied exclusively for generating steam or exclusively for generating hot water, or wherein the second continuous flow heater (18) can be switched between a steam generating mode and a hot water generating mode.

8. The beverage preparation device according to claim 1, wherein a pump (15, 16) is in each case assigned to the first continuous-flow heater (17) and to the second continuous-flow heater (18) or wherein a common pump is assigned to both continuous-flow heaters (17, 18).

9. The beverage preparation device according to claim 8, wherein, in at least one large quantity hot water operating mode, current is fed to both pumps (15, 16), so as to simultaneously supply water to both continuous-flow heaters (17, 18) for the respective production of hot water, or wherein a single pump (15, 16) for supplying water to both continuous-flow heaters (17, 18), for the respective generation of hot water is operated at a flow rate, which is higher in at least one large quantity hot water mode than in a normal hot water operating mode, in which only one of the continuous-flow heaters generates hot water.

10. The beverage preparation device according to claim 1, wherein, in a first large quantity hot water operating mode, the first and the second inlet (3, 1) of the manifold valve (21) are connected to the common outlet so as to supply hot water to a consumer, which is connected to the common outlet, and/or wherein, in a second large quantity hot water operating mode, the first and the second inlet (3, 1) of the manifold valve (21) are connected to separate outlets, so as to simultaneously supply hot water to two different consumers.

11. The beverage preparation device according to claim 1, wherein, in at least one hot water operating mode, in which the first and the second inlet (3, 1) of the manifold valve (21) are connected to separate outlets or to the common outlet, hot water can be generated by means of the first continuous-flow heater (17), which is embodied exclusively for generating hot water, and, at the same time, steam can be generated by means of the second continuous-flow heater (18), which is embodied exclusively for generating steam, so as to heat the water, which is heated to a first temperature by means of the first continuous-flow heater (17), to a second temperature, which is higher than the first temperature, by adding steam in the manifold valve (21).

12. The beverage preparation device according to claim 11, wherein, in the hot water operating mode, the first continuous-flow heater (17) can be supplied with a larger hot water volume flow than in a different operating mode, in which hot water can also be generated by means of the first continuous-flow heater (17), wherein, in the different operating mode, the second continuous-flow heater cannot supply steam to the hot water, which is heated by means of the first continuous-flow heater.

13. The beverage preparation device according to claim 1, wherein, in a combined steam and hot water operating mode, in which the first and the second inlet (3, 1) of the manifold valve (21) are connected to separate outlets, hot water can be generated by means of the first continuous-flow heater (17) and steam can be generated by means of the second continuous-flow heater (18), so as to simultaneously supply hot water to a first consumer comprising a brewing unit (26) or a water delivery faucet (34), and so as to supply steam to a further second consumer comprising a frothing device (39) for milk.

14. A method for operating a beverage preparation device according to claim 1, wherein water is conveyed to a first continuous-flow heater (17), which is embodied for generating hot water, by means of at least one water pump, and to a second continuous-flow heater (18), which is also embodied for generating hot water and/or for generating steam,
wherein the first continuous-flow heater (17) is connected to a first inlet (3) of a manifold valve (21) via a first connecting line (20) and the second continuous-flow heater (18) is connected to a second inlet (1) of the same manifold valve (21) via a second connecting line (22), and
wherein fluid flows which are conveyed to the first inlet (3) and to the second inlet (1) are combined in a first switch position by means of the manifold valve (21) and are guided to a common consumer, and wherein the fluid flows which are conveyed to the first inlet (3) and to the second inlet (1) in a second switch position by means of the manifold valve (21) are transferred separately from one another to different consumers.

15. The method according to claim 14, wherein, in a first large quantity hot water operating mode, the first and the second inlet (3, 1) of the manifold valve (21) are connected to separate outlets or to the common outlet of the manifold valve (21), and wherein hot water is supplied to a common consumer, and/or wherein, in a second large quantity hot water operating mode, the first and the second inlet (3, 1) of the manifold valve (21) are connected to separate outlets of the manifold valve (21), and wherein hot water is simultaneously supplied to two different consumers.

16. The method according to claim 14, operating in at least one hot water operating mode, in which the first and the second inlet (3, 1) of the manifold valve (21) are connected to separate outlets or to the common outlet of the manifold valve (21), wherein hot water is generated by means of the first continuous-flow heater (17), which is embodied exclusively for generating hot water, and wherein steam is simultaneously generated by means of the second continuous-flow heater (18), which is embodied exclusively for generating steam, and wherein the hot water, which the first continuous-flow heater (17) heats to a first temperature, is heated to a second temperature, which is higher than the first temperature, by adding steam in the manifold valve (21).

17. The method according to claim 14, wherein, in a combined steam and hot water mode, in which the first and the second inlet (3, 1) of the manifold valve (21) are connected to separate outlets of the manifold valve, hot water is generated by means of the first continuous-flow heater (17) and steam is generated by means of the second continuous-flow heater (18), and hot water is supplied simultaneously to a first consumer comprising a brewing unit (26) or a water delivery faucet (34), and steam is supplied to a further, second consumer, comprising a frothing device (39) for milk.

18. The beverage preparation device of claim 1, wherein the beverage preparation device is a coffee maker.

19. The beverage preparation device of claim 1, wherein the separate outlets of the first switch position and the common outlet of the second switch position are outlets from said same manifold valve (21).

* * * * *